(12) United States Patent
Grossman et al.

(10) Patent No.: US 9,009,171 B1
(45) Date of Patent: Apr. 14, 2015

(54) SYSTEMS AND METHODS FOR ACTIVE COLUMN FILTERING

(71) Applicant: Palantir Technologies, Inc., Palo Alto, CA (US)

(72) Inventors: Jack Grossman, San Francisco, CA (US); James Thompson, San Francisco, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/268,964

(22) Filed: May 2, 2014

(51) Int. Cl.
G06F 17/30 (2006.01)

(52) U.S. Cl.
CPC .............................. *G06F 17/30315* (2013.01)

(58) Field of Classification Search
None
See application file for complete search history.

(56) References Cited

U.S. PATENT DOCUMENTS

| | | | |
|---|---|---|---|
| 5,109,399 | A | 4/1992 | Thompson |
| 5,329,108 | A | 7/1994 | Lamoure |
| 5,632,987 | A | 5/1997 | Rao et al. |
| 5,670,987 | A | 9/1997 | Doi et al. |
| 5,781,704 | A | 7/1998 | Rossmo |
| 5,845,300 | A | 12/1998 | Comer |
| 6,057,757 | A | 5/2000 | Arrowsmith et al. |
| 6,091,956 | A | 7/2000 | Hollenberg |
| 6,161,098 | A | 12/2000 | Wallman |
| 6,219,053 | B1 | 4/2001 | Tachibana et al. |
| 6,232,971 | B1 | 5/2001 | Haynes |
| 6,247,019 | B1 | 6/2001 | Davies |
| 6,279,018 | B1 | 8/2001 | Kudrolli et al. |
| 6,341,310 | B1 | 1/2002 | Leshem et al. |
| 6,366,933 | B1 | 4/2002 | Ball et al. |
| 6,369,835 | B1 | 4/2002 | Lin |
| 6,456,997 | B1 | 9/2002 | Shukla |
| 6,549,944 | B1 | 4/2003 | Weinberg et al. |
| 6,560,620 | B1 | 5/2003 | Ching |
| 6,581,068 | B1 | 6/2003 | Bensoussan et al. |

(Continued)

FOREIGN PATENT DOCUMENTS

| | | |
|---|---|---|
| DE | 102014103482 | 9/2014 |
| EP | 1672527 | 6/2006 |

(Continued)

OTHER PUBLICATIONS

"A First Look: Predicting Market Demand for Food Retail using a Huff Analysis," TRF Policy Solutions, Jul. 2012, pp. 30.

(Continued)

*Primary Examiner* — Hung Le
(74) *Attorney, Agent, or Firm* — Finnegan, Henderson, Farabow, Garrett & Dunner, LLP (57) ABSTRACT

Systems and methods are disclosed for active column filtering. In accordance with one implementation, a method is provided for active column filtering. The method includes providing a table having data values arranged in rows and columns, providing a first filter location indicator whose location is visually associated with a first column, and providing a first interface based on a selection of the first filter location indicator, wherein the first interface's location is visually associated with the first column. The method also includes acquiring a first filter input entered into the first interface, filtering the table based on the acquired first filter input, providing the filtered table for displaying, and providing an applied filter indicator, whose location is visually associated with the first column, the applied filter indicator including at least the first filter input.

20 Claims, 7 Drawing Sheets

(56) References Cited

U.S. PATENT DOCUMENTS

| | | |
|---|---|---|
| 6,594,672 B1 | 7/2003 | Lampson et al. |
| 6,631,496 B1 | 10/2003 | Li et al. |
| 6,714,936 B1 | 3/2004 | Nevin, III |
| 6,775,675 B1 | 8/2004 | Nwabueze et al. |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witkowski |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 * | 5/2008 | Gorman .................... 1/1 |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,454,466 B2 | 11/2008 | Bellotti et al. |
| 7,467,375 B2 | 12/2008 | Tondreau et al. |
| 7,487,139 B2 * | 2/2009 | Fraleigh et al. ............ 1/1 |
| 7,502,786 B2 | 3/2009 | Liu et al. |
| 7,525,422 B2 | 4/2009 | Bishop et al. |
| 7,529,727 B2 | 5/2009 | Arning et al. |
| 7,558,677 B2 | 7/2009 | Jones |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 * | 11/2009 | Molander ................ 715/764 |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,770,100 B2 | 8/2010 | Chamberlain et al. |
| 7,805,457 B1 | 9/2010 | Viola et al. |
| 7,809,703 B2 | 10/2010 | Balabhadrapatruni et al. |
| 7,818,658 B2 | 10/2010 | Chen |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,962,281 B2 | 6/2011 | Rasmussen et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,280,880 B1 | 10/2012 | Aymeloglu et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,312,546 B2 | 11/2012 | Alme |
| 8,352,881 B2 | 1/2013 | Champion et al. |
| 8,368,695 B2 | 2/2013 | Howell et al. |
| 8,397,171 B2 | 3/2013 | Klassen et al. |
| 8,412,707 B1 | 4/2013 | Mianji |
| 8,447,722 B1 | 5/2013 | Ahuja et al. |
| 8,452,790 B1 | 5/2013 | Mianji |
| 8,463,036 B1 | 6/2013 | Ramesh et al. |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,709 B2 | 10/2013 | Goodson et al. |
| 8,577,911 B1 | 11/2013 | Stepinski et al. |
| 8,589,273 B2 | 11/2013 | Creeden et al. |
| 8,620,641 B2 | 12/2013 | Farnsworth et al. |
| 8,646,080 B2 | 2/2014 | Williamson et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,745,516 B2 | 6/2014 | Mason et al. |
| 8,781,169 B2 | 7/2014 | Jackson et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 2002/0033848 A1 | 3/2002 | Sciammarella et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0174201 A1 | 11/2002 | Ramer et al. |
| 2003/0028560 A1 | 2/2003 | Kudrolli et al. |
| 2003/0039948 A1 | 2/2003 | Donahue |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 * | 12/2003 | Arend et al. ............. 715/509 |
| 2004/0032432 A1 * | 2/2004 | Baynger ................ 345/810 |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0143602 A1 | 7/2004 | Ruiz et al. |
| 2004/0163039 A1 * | 8/2004 | Gorman ................ 715/505 |
| 2004/0193600 A1 | 9/2004 | Kaasten et al. |
| 2004/0260702 A1 | 12/2004 | Cragun et al. |
| 2005/0027705 A1 | 2/2005 | Sadri et al. |
| 2005/0028094 A1 | 2/2005 | Allyn |
| 2005/0080769 A1 | 4/2005 | Gemmell |
| 2005/0086207 A1 | 4/2005 | Heuer et al. |
| 2005/0125715 A1 | 6/2005 | Di Franco et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0246327 A1 * | 11/2005 | Yeung et al. ............... 707/3 |
| 2005/0251786 A1 | 11/2005 | Citron et al. |
| 2006/0026120 A1 | 2/2006 | Carolan et al. |
| 2006/0026170 A1 | 2/2006 | Kreitler et al. |
| 2006/0059139 A1 | 3/2006 | Robinson |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |

(56) References Cited

U.S. PATENT DOCUMENTS

| | | |
|---|---|---|
| 2006/0242040 A1 | 10/2006 | Rader |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1* | 4/2007 | Fraleigh et al. ............... 707/102 |
| 2007/0174760 A1 | 7/2007 | Chamberlain et al. |
| 2007/0192265 A1 | 8/2007 | Chopin et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0266336 A1 | 11/2007 | Nojima et al. |
| 2007/0294643 A1 | 12/2007 | Kyle |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0104019 A1 | 5/2008 | Nath |
| 2008/0126951 A1 | 5/2008 | Sood et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0222295 A1 | 9/2008 | Robinson et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0301643 A1 | 12/2008 | Appleton et al. |
| 2009/0002492 A1 | 1/2009 | Velipasalar et al. |
| 2009/0027418 A1 | 1/2009 | Maru et al. |
| 2009/0030915 A1 | 1/2009 | Winter et al. |
| 2009/0055251 A1 | 2/2009 | Shah et al. |
| 2009/0088964 A1 | 4/2009 | Schaaf et al. |
| 2009/0119309 A1 | 5/2009 | Gibson et al. |
| 2009/0125369 A1 | 5/2009 | Kloostra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1* | 6/2009 | Fraleigh et al. ............... 707/5 |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0222400 A1 | 9/2009 | Kupershmidt et al. |
| 2009/0222760 A1* | 9/2009 | Halverson et al. ............ 715/781 |
| 2009/0234720 A1 | 9/2009 | George et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0070523 A1 | 3/2010 | Delgo et al. |
| 2010/0070897 A1 | 3/2010 | Aymeloglu et al. |
| 2010/0100963 A1 | 4/2010 | Mahaffey |
| 2010/0103124 A1* | 4/2010 | Kruzeniski et al. ........... 345/173 |
| 2010/0114887 A1 | 5/2010 | Conway et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0250412 A1 | 9/2010 | Wagner |
| 2010/0280857 A1 | 11/2010 | Liu et al. |
| 2010/0293174 A1 | 11/2010 | Bennett et al. |
| 2010/0306713 A1 | 12/2010 | Geisner et al. |
| 2010/0321399 A1 | 12/2010 | Ellren et al. |
| 2010/0325526 A1* | 12/2010 | Ellis et al. ..................... 715/217 |
| 2010/0325581 A1 | 12/2010 | Finkelstein et al. |
| 2010/0330801 A1 | 12/2010 | Rouh |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078173 A1 | 3/2011 | Seligmann et al. |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167710 A1 | 7/2011 | Boys |
| 2011/0170799 A1 | 7/2011 | Carrino et al. |
| 2011/0173032 A1 | 7/2011 | Payne et al. |
| 2011/0208724 A1 | 8/2011 | Jones et al. |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0270705 A1 | 11/2011 | Parker |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0019559 A1 | 1/2012 | Siler et al. |
| 2012/0036013 A1 | 2/2012 | Neuhaus et al. |
| 2012/0036434 A1 | 2/2012 | Oberstein |
| 2012/0066296 A1 | 3/2012 | Appleton et al. |
| 2012/0079363 A1 | 3/2012 | Folting et al. |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0159307 A1 | 6/2012 | Chung et al. |
| 2012/0159399 A1* | 6/2012 | Bastide et al. ................ 715/854 |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0221511 A1 | 8/2012 | Gibson et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0290879 A1 | 11/2012 | Shibuya et al. |
| 2012/0296907 A1 | 11/2012 | Long et al. |
| 2012/0323888 A1 | 12/2012 | Osann, Jr. |
| 2012/0330973 A1 | 12/2012 | Ghuneim et al. |
| 2013/0006725 A1 | 1/2013 | Simanek et al. |
| 2013/0046842 A1 | 2/2013 | Muntz et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0078943 A1 | 3/2013 | Biage et al. |
| 2013/0097482 A1 | 4/2013 | Marantz et al. |
| 2013/0111320 A1* | 5/2013 | Campbell et al. ............. 715/212 |
| 2013/0117651 A1 | 5/2013 | Waldman et al. |
| 2013/0101159 A1 | 6/2013 | Rosen |
| 2013/0150004 A1 | 6/2013 | Rosen |
| 2013/0157234 A1 | 6/2013 | Gulli et al. |
| 2013/0176321 A1 | 7/2013 | Mitchell et al. |
| 2013/0179420 A1 | 7/2013 | Park et al. |
| 2013/0224696 A1 | 8/2013 | Wolfe et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262527 A1 | 10/2013 | Hunter et al. |
| 2013/0263019 A1 | 10/2013 | Castellanos et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandarsekaran et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |

(56) References Cited

U.S. PATENT DOCUMENTS

| | | | |
|---|---|---|---|
| 2014/0040371 A1 | 2/2014 | Gurevich et al. | |
| 2014/0047357 A1 | 2/2014 | Alfaro et al. | |
| 2014/0059038 A1* | 2/2014 | McPherson et al. | 707/722 |
| 2014/0068487 A1 | 3/2014 | Steiger et al. | |
| 2014/0095509 A1 | 4/2014 | Patton | |
| 2014/0108068 A1 | 4/2014 | Williams | |
| 2014/0108380 A1 | 4/2014 | Gotz et al. | |
| 2014/0108985 A1 | 4/2014 | Scott et al. | |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0195515 A1 | 7/2014 | Baker et al. | |
| 2014/0195887 A1* | 7/2014 | Ellis et al. | 715/212 |
| 2014/0267294 A1 | 9/2014 | Ma | |
| 2014/0267295 A1 | 9/2014 | Sharma | |
| 2014/0279824 A1 | 9/2014 | Tamayo | |
| 2014/0316911 A1 | 10/2014 | Gross | |
| 2014/0333651 A1 | 11/2014 | Cervelli et al. | |
| 2014/0337772 A1 | 11/2014 | Cervelli et al. | |

FOREIGN PATENT DOCUMENTS

| | | |
|---|---|---|
| EP | 2551799 | 1/2013 |
| EP | 2778977 | 9/2014 |
| EP | 2838039 | 2/2015 |
| GB | 2516155 | 1/2015 |
| NZ | 624557 | 12/2014 |
| WO | WO 00/09529 | 2/2000 |
| WO | WO 2005/104736 | 11/2005 |
| WO | WO 2009/061501 | 5/2009 |
| WO | WO 2010/000014 | 1/2010 |
| WO | WO 2010/030913 | 3/2010 |

OTHER PUBLICATIONS

"A Quick Guide to UniProtKB Swiss-Prot & TrEMBL," Sep. 2011, pp. 2.
Acklen, Laura, "Absolute Beginner's Guide to Microsoft Word 2003," Dec. 24, 2003, pp. 15-18, 34-41, 308-316.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Bluttman et al., "Excel Formulas and Functions for Dummies," 2005, Wiley Publishing, Inc., pp. 280, 284-286.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Canese et al., "Chapter 2: PubMed: The Bibliographic Database," The NCBI Handbook, Oct. 2002, pp. 1-10.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Conner, Nancy, "Google Apps: The Missing Manual," May 1, 2008, pp. 15.
Delcher et al., "Identifying Bacterial Genes and Endosymbiont DNA with Glimmer," BioInformatics, vol. 23, No. 6, 2007, pp. 673-679.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
GIS-NET 3 Public—Department of Regional Planning. Planning & Zoning Information for Unincorporated LA County. Retrieved Oct. 2, 2013 from http://gis.planning.lacounty.gov/GIS-NET3_Public/Viewer.html.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Hansen et al. "Analyzing Social Media Networks with NodeXL: Insights from a Connected World", Chapter 4, pp. 53-67 and Chapter 10, pp. 143-164, published Sep. 2010.
Hibbert et al., "Prediction of Shopping Behavior Using a Huff Model Within a GIS Framework," Healthy Eating in Context, Mar. 18, 2011, pp. 16.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
Kahan et al., "Annotea: an open RDF infrastructure for shared WEB annotations", Computer Networks 39, pp. 589-608, 2002.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Map of San Jose, CA. Retrieved Oct. 2, 2013 from http://maps.bing.com.
Map of San Jose, CA. Retrieved Oct. 2, 2013 from http://maps.google.com.
Map of San Jose, CA. Retrieved Oct. 2, 2013 from http://maps.yahoo.com.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Mizrachi, Ilene, "Chapter 1: GenBank: The Nuckeotide Sequence Database," The NCBI Handbook, Oct. 2002, pp. 1-14.
Palmas et al., "An Edge-Bunding Layout for Interactive Parallel Coordinates" 2014 IEEE Pacific Visualization Symposium, pp. 57-64.
Rouse, Margaret, "OLAP Cube," <http://searchdatamanagement.techtarget.com/definition/OLAP-cube>, Apr. 28, 2012, pp. 16.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
"The FASTA Program Package," fasta-36.3.4, Mar. 25, 2011, pp. 29.
Issue Notification for U.S. Appl. No. 13/917,571 dated Aug. 5, 2014.
Notice of Allowance for U.S. Appl. No. 14/102,394 dated Aug. 25, 2014.
Notice of Allowance for U.S. Appl. No. 14/108,187 dated Aug. 29, 2014.
Notice of Allowance for U.S. Appl. No. 14/135,289 dated Oct. 14, 2014.
Official Communication for New Zealand Patent Application No. 624557 dated May 14, 2014.

(56) References Cited

OTHER PUBLICATIONS

Official Communication for New Zealand Patent Application No. 628585 dated Aug. 26, 2014.
Official Communication for European Patent Application No. 14158861.6 dated Jun. 16, 2014.
Official Communication for New Zealand Patent Application No. 622517 dated Apr. 3, 2014.
Official Communication for Great Britain Patent Application No. 1404457.2 dated Aug. 14, 2014.
Official Communication for New Zealand Patent Application No. 627962 dated Aug. 5, 2014.
Official Communication for European Patent Application No. 14159464.8 dated Jul. 31, 2014.
Official Communication for European Patent Application No. 14159464.8 dated Aug. 20, 2014.
Official Communication for European Patent Application No. 14159464.8 dated Sep. 22, 2014.
Official Communication for New Zealand Patent Application No. 628840 dated Aug. 28, 2014.
Official Communication in New Zealand Application No. 628495 dated Aug. 19, 2014.
Official Communication for United Kingdom Patent Application No. 1408025.3 dated Nov. 6, 2014.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/225,160 dated Jul. 29, 2014.
Official Communication for U.S. Appl. No. 14/268,964 dated Sep. 3, 2014.
Official Communication for U.S. Appl. No. 14/225,084 dated Sep. 2, 2014.
Official Communication for U.S. Appl. No. 14/294,098 dated Aug. 15, 2014.
Official Communication for U.S. Appl. No. 14/148,568 dated Oct. 22, 2014.
Official Communication for U.S. Appl. No. 14/225,006 dated Sep. 10, 2014.
Official Communication for U.S. Appl. No. 14/294,098 dated Nov. 6, 2014.
Official Communication for U.S. Appl. No. 14/306,138 dated Sep. 23, 2014.
Official Communication for U.S. Appl. No. 14/306,154 dated Sep. 9, 2014.
Official Communication for U.S. Appl. No. 14/306,147 dated Sep. 9, 2014.
Nierman, "Evaluating Structural Similarity in XML Documents," 2002, 6 pages.
Yang et al., "HTML Page Analysis Based on Visual Cues," 2001, pp. 859-864.
Notice of Allowance for U.S. Appl. No. 14/473,860 dated Jan. 5, 2015.
Notice of Allowance for U.S. Appl. No. 14/192,767 dated Dec. 16, 2014.
Notice of Allowance for U.S. Appl. No. 14/294,098 dated Dec. 29, 2014.
Official Communication for U.S. Appl. No. 14/319,765 dated Nov. 25, 2014.
Official Communication for U.S. Appl. No. 14/323,935 dated Nov. 28, 2014.
Official Communication for U.S. Appl. No. 14/326,738 dated Dec. 2, 2014.

\* cited by examiner

Suspicious email activity:

| Date & Time | From | Attachment | Size (in KB) |
|---|---|---|---|
| 4/3/14 11:52 AM | caroldavies@yaho... | | 1.3 |
| 4/3/14 11:12 AM | zoe.anderson@gma... | presentation.pdf | 5,823 |
| 4/3/14 9:15 AM | dan.reid@gma... | | 0.5 |
| 4/3/14 9:15 AM | marksmith77@att... | resume.docx | 1,823 |
| 4/3/14 8:44 AM | donotreply@exam... | hello.exe | 7,400 |
| 4/3/14 8:02 AM | customerservice@a... | video.exe | 722,554 |
| 4/2/14 7:37 PM | whitedan@gma... | | 2.8 |
| 4/2/14 6:16 PM | sudanhelp@sud... | | 1.1 |

| Suspicious email activity: | | | |
|---|---|---|---|
| Date & Time | From gmai_ | Attachment | Size (in KB) |
| 4/3/14 11:52 AM | caroldavies@yaho... | | 1.3 |
| 4/3/14 11:12 AM | zoe.anderson@gma... | presentation.pdf | 5,823 |
| 4/3/14 9:15 AM | dan.reid@gma... | | 0.5 |
| 4/3/14 9:15 AM | marksmith77@att... | resume.docx | 1,823 |
| 4/3/14 8:44 AM | donotreply@exam.. | hello.exe | 7,400 |
| 4/3/14 8:02 AM | customerservice@a... | video.exe | 722,554 |
| 4/2/14 7:37 PM | whitedan@gma... | | 2.8 |
| 4/2/14 6:16 PM | sudanhelp@sud... | | 1.1 |

FIG. 5A

| Suspicious email activity: | | | |
|---|---|---|---|
| Date & Time | gmail From | Attachment | Size (in KB) |
| 4/3/14 11:12 AM | zoe.anderson@gma... | presentation.pdf | 5,823 |
| 4/3/14 9:15 AM | dan.reid@gma... | | 0.5 |
| 4/2/14 7:37 PM | whitedan@gma... | | 2.8 |

FIG. 5B

Suspicious email activity:

| Date & Time | yahoo / gmail From | Attachment | Size (in KB) |
|---|---|---|---|
| 4/3/14 11:12 AM | zoe.anderson@gma... | presentation.pdf | 5,023 |
| 4/3/14 9:15 AM | dan.reid@gma... | | 0.5 |
| 4/2/14 7:37 PM | whitedan@gma... | | 2.8 |

FIG. 5C

Suspicious email activity:

| Date & Time | gmail or yahoo From | Attachment | Size (in KB) |
|---|---|---|---|
| 4/3/14 11:52 AM | caroldavies@yaho... | | 1.3 |
| 4/3/14 11:12 AM | zoe.anderson@gma... | presentation.pdf | 5,823 |
| 4/3/14 9:15 AM | dan.reid@gma... | | 0.5 |
| 4/2/14 7:37 PM | whitedan@gma... | | 2.8 |

SYSTEMS AND METHODS FOR ACTIVE COLUMN FILTERING

BACKGROUND

Vast amounts of data are readily available to analysts, researchers, and laypeople today, on the one hand allowing them to perform more complicated and detailed data analyses than ever, but on the other hand making it more difficult to find the information that is relevant and filter out the information that is not.

BRIEF DESCRIPTION OF THE DRAWINGS

Reference will now be made to the accompanying drawings, which illustrate exemplary embodiments of the present disclosure. In the drawings.

DESCRIPTION OF EXEMPLARY EMBODIMENTS

Reference will now be made in detail to several exemplary embodiments of the present disclosure, including those illustrated in the accompanying drawings. Whenever possible, the same reference numbers will be used throughout the drawings to refer to the same or like parts.

Embodiments disclosed herein are directed, among other things, to systems and methods that allow the user to filter large amounts of data in a quick, logical, and visually associative way. More specifically, the systems and methods can, among other things, provide a table having data values arranged in rows and columns, provide a first filter location indicator that is visually associated with a first column, provide a first interface at a location visually associated with the first column, acquire a first filter input entered into the first interface, filter the table based on the acquired first filter input, and provide, at a location visually associated with the first column, an applied filter indicator that includes at least the first filter input.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

Figure 1:
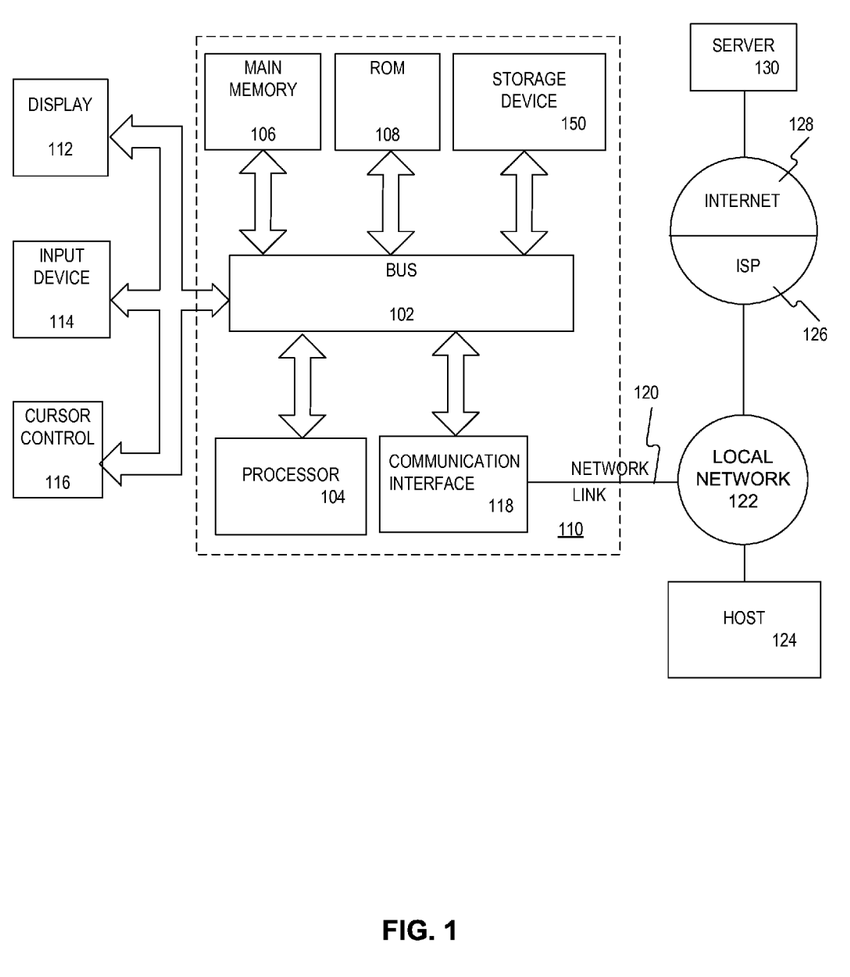
FIG. 1 is a block diagram of an exemplary electronic device, consistent with embodiments of the present disclosure.

By way of example, FIG. 1 is a block diagram that illustrates an implementation of an electronic device 110, which, as described above, can comprise one or more electronic devices. Electronic device 110 includes a bus 102 or other communication mechanism for communicating information, and one or more hardware processors 104, coupled with bus 102 for processing information. One or more hardware processors 104 can be, for example, one or more microprocessors.

Electronic device 110 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render electronic device 110 into a special-purpose machine that is customized to perform the operations specified in the instructions.

Electronic device 110 further includes a read only memory (ROM) 108 or other static storage device coupled to bus 102 for storing static information and instructions for processor 104. A storage device 150, such as a magnetic disk, optical disk, or USB thumb drive (Flash drive), etc., is provided and coupled to bus 102 for storing information and instructions.

Electronic device 110 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 110 can implement the techniques and other features described herein using customized hard-wired logic, one or more ASICs or FPGAs, firmware and/or program logic which in combination with the electronic device causes or programs electronic device 110 to be a special-purpose machine. According to some embodiments, the techniques and other features described herein are performed by electronic device 110 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 150. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media can be involved in carrying one or more sequences of one or more instructions to processor 104 for execution. For example, the instructions can initially be carried on a magnetic disk or solid state drive of a remote computer. The remote computer can load the instructions into its dynamic memory and send the instructions over a telephone line using a modem. A modem local to electronic device 110 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Electronic device 110 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from electronic device 110, are example forms of transmission media.

Electronic device 110 can send messages and receive data, including program code, through the network(s), network link 120 and communication interface 118. In the Internet example, a server 130 might transmit a requested code for an application program through Internet 128, ISP 126, local network 122 and communication interface 118.

The received code can be executed by processor 104 as it is received, and/or stored in storage device 150, or other non-volatile storage for later execution.

Figure 2:
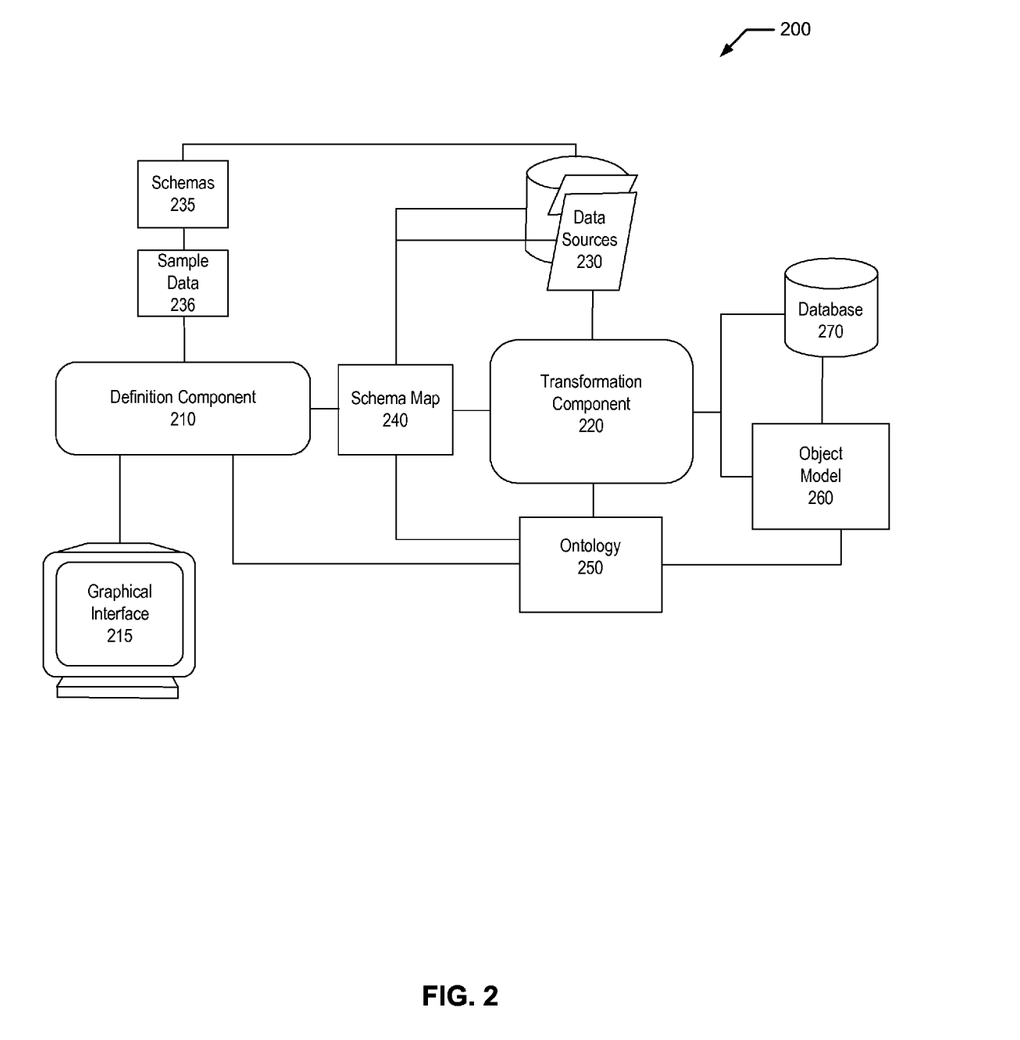
FIG. 2 is a block diagram of an exemplary data fusion system, consistent with embodiments of the present disclosure.

FIG. 2 shows, in block diagram form, an exemplary data fusion system 200, consistent with embodiments of the present disclosure. In some embodiments, data fusion system 200 can be a part of or communicatively coupled to electronic device 110. Among other things, system 200 can facilitate transformation of one or more data sources, such as data sources 230, into an object model 260, whose semantics are defined by an ontology 250. The transformation can be performed for a variety of reasons. For example, a database administrator can wish to import data from data sources 230 into a database 270 for persistently storing object model 260. As another example, a data presentation component (not depicted) can transform input data from data sources 230 "on the fly" into object model 260. Object model 260 can then be utilized, in conjunction with ontology 250, for analysis through graphs and/or other data visualization techniques.

System 200 comprises a definition component 210 and a translation component 220, both implemented by one or more processors on one or more computing devices executing hardware and/or software-based logic for providing various functionality described herein. As will be appreciated from the present disclosure, system 200 can comprise fewer or additional components that provide various functionalities described herein. Such components are, for clarity, omitted from FIG. 2. Moreover, the component(s) of system 200 responsible for providing various functionalities can further vary from embodiment to embodiment.

Definition component 210 generates and/or modifies ontology 250 and a schema map 240. Exemplary embodiments for defining an ontology (such as ontology 250) are described in U.S. Pat. No. 7,962,495 (the '495 patent), issued Jun. 14, 2011, the entire contents of which are expressly incorporated herein by reference. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time. And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring to FIG. 2, schema map 240 can define how various elements of schemas 235 for data sources 230 map to various elements of ontology 250. Definition component 210 receives, calculates, extracts, or otherwise identifies schemas 235 for data sources 230. Schemas 235 define the structure of data sources 230—for example, the names and other characteristics of tables, files, columns, fields, properties, and so forth. Definition component 210 furthermore optionally identifies sample data 236 from data sources 230. Definition component 210 can further identify object type, relationship, and property definitions from ontology 250, if any already exist. Definition component 210 can further identify pre-existing mappings from schema map 240, if such mappings exist.

Based on the identified information, definition component 210 can generate a graphical interface 215. Graphical interface 215 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 215 features a visual workspace that visually depicts representations of the elements of ontology 250 for which mappings are defined in schema map 240. Graphical interface 215 also includes controls for adding new elements to schema map 240 and/or ontology 250, including objects, properties of objects, and relationships, via the visual workspace. After elements of ontology 250 are represented in the visual workspace, graphical interface 215 can further provide controls in association with the representations that allow for modifying the elements of ontology 250 and identifying how the elements of ontology 250 correspond to elements of schemas 235. Optionally, the graphical interface 215 can further utilize sample data 236 to provide the user with a preview of object model 260 as the user defines schema map 240. In response to the input via the various controls of graphical interface 215, definition component 210 can generate and/or modify ontology 250 and schema map 240.

In some embodiments, graphical interface 215 can provide an interface providing a user with the ability to add structure to an unstructured document stored in data sources 230 by tagging one or more portions (e.g., text) within the document. Defining tags and applying these tags to a portion of the document can create object, properties, or links creating a relationship between one or more objects and/or properties.

Transformation component 220 can be invoked after schema map 240 and ontology 250 have been defined or redefined. Transformation component 220 identifies schema map 240 and ontology 250. Transformation component 220 further reads data sources 230 and identifies schemas 235 for data sources 230. For each element of ontology 250 described in schema map 240, transformation component 220 iterates through some or all of the data items of data sources 230, generating elements of object model 260 in the manner specified by schema map 240. In some embodiments, transformation component 220 can store a representation of each generated element of object model 260 in a database 270. In some embodiments, transformation component 220 is further configured to synchronize changes in object model 260 back to data sources 230.

Data sources 230 can be one or more sources of data, including, without limitation, spreadsheet files, databases, email folders, document collections, media collections, contact directories, and so forth. Data sources 230 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 230 can include data structures stored persistently in non-volatile memory. Data sources 230 can also or alternatively include temporary data structures generated from underlying data sources via data extraction components, such as a result set returned from a database server executing a database query.

Schema map 240, ontology 250, and schemas 235 can be stored in any suitable data structure(s), such as XML files, database tables, and so forth. In some embodiments, ontology 250 is maintained persistently. Schema map 240 can or cannot be maintained persistently, depending on whether the transformation process is perpetual or a one-time event. Schemas 235 need not be maintained in persistent memory, but can be cached for optimization.

Object model 260 comprises collections of elements such as typed objects, properties, and relationships. The collections can be structured in any suitable manner. In some embodiments, a database 270 stores the elements of object model 260, or representations thereof. In some embodiments, the elements of object model 260 are stored within database 270 in a different underlying format, such as in a series of object, property, and relationship tables in a relational database.

Figure 3:
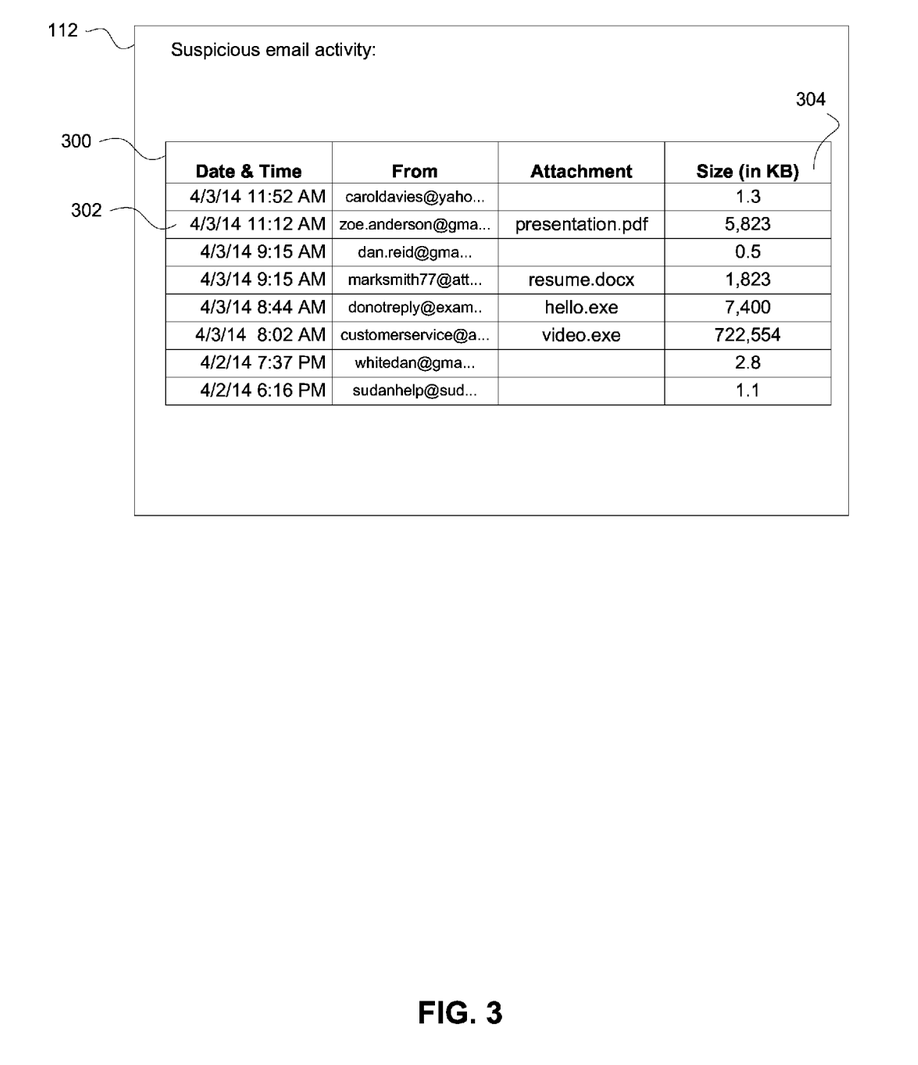
FIG. 3 is an exemplary display displaying an exemplary table of data values, consistent with embodiments of the present disclosure.

FIG. 3 shows an exemplary table 300 as displayed, for example, on display 112, in accordance with some embodiments. Table 300 can include data values 302 arranged in one or more rows and one or more columns. Table 300 can also include a header row, providing, for each column, header area 304 and header information, such as title. Data values can include any type of characters, including, for example, one or more numeric characters, alphabetic characters, alphanumeric characters, and special characters. Data values can be unformatted or formatted, for example, as numbers, strings, dates, currency, and so forth. In some embodiments, the table can include empty cells that contain no data values or data values marked as empty. A row can contain data values that are associated with each other. For example, all data values in the same row can represent a particular event, each data value describing a different parameter related to that event. The rows in the table can be unsorted, or they can be sorted, for example, by a data value appearing in a particular column. For example, if each row represents a particular event, one of the data values positioned in a particular column can correspond to the date and time of that event. In this example, the rows can be sorted in a chronological or a reversed chronological order, the most recent events appearing at the top or at the bottom, respectively.

Figure 4:
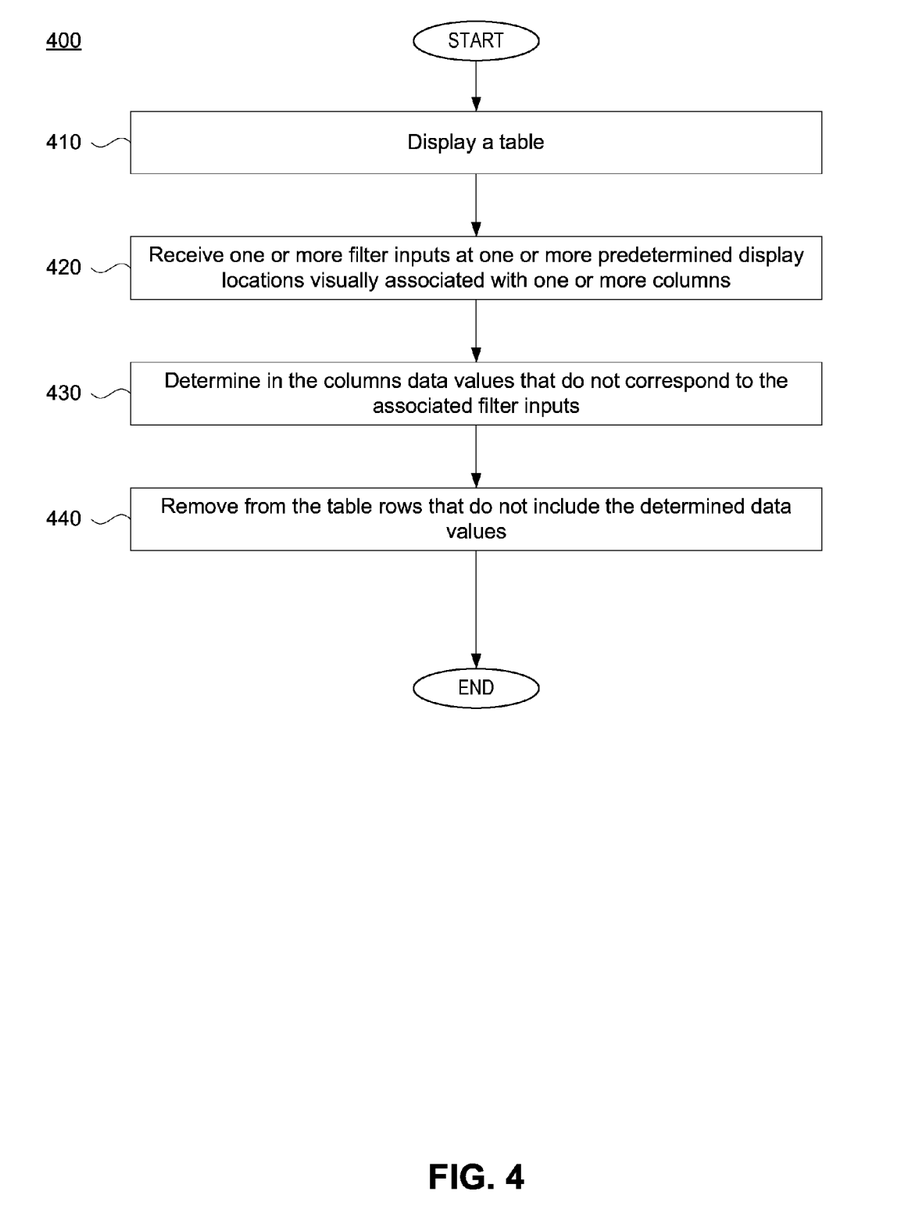
FIG. 4 is a flowchart of an exemplary method for active column filtering, consistent with embodiments of the present disclosure.

FIG. 4 shows a flowchart representing an exemplary method 400 of active column filtering. In some embodiments, method 400 can be performed by a client application (e.g., a web browser) running on a client device, by a server (e.g., a web server), or it can have some steps (or parts thereof) executed on the client device, and some steps (or parts thereof) executed on the server. Thus, method 400 can be performed by one or more electronic devices, such as electronic device 110. And while method 400 and the other following embodiments described herein can be performed by multiple electronic devices each having one or more processors, for purposes of simplicity and without limitation, these embodiments will be explained with respect to a single electronic device (e.g., electronic device 110). While the flowchart discloses the following steps in a particular order, it is appreciated that at least some of the steps can be moved, modified, or deleted where appropriate, consistent with the teachings of the present disclosure.

At step 410, the electronic device displays one or more data values arranged in a table (e.g., table 300).

At step 420, the electronic device receives filter input. In some embodiments, the filter input can be received automatically from another process or application. In other embodiments, the filter input can be received from a user at a predetermined filter location on the display, where the predetermined filter location is visually associated with a particular column. As discussed below, the user can input multiple filter inputs, each filter input being visually associated with one column, but each column capable of being visually associated with multiple filter inputs.

A location can be said to be "visually associated" with a particular column, for example, when the location's visual association with the particular column is stronger than its visual association with any other columns. For example, the location can be visually associated with a particular column when it is within a close proximity of the particular column, or when it is closer to the particular column than to any other column, as measured, for example, based on the horizontal distance between the location and the column. As another example, a location can be visually associated with a particular column when the location's horizontal position falls within the two boundaries of the particular column, or when the location's horizontal position is within a predetermined threshold from one of the boundaries of the particular column.

In some embodiments, the location can be visually associated with a particular column when the location is inside the header of the particular column, directly or substantially adjacent to the column header, has some overlap with the column header, and so forth.

Figure 5A:
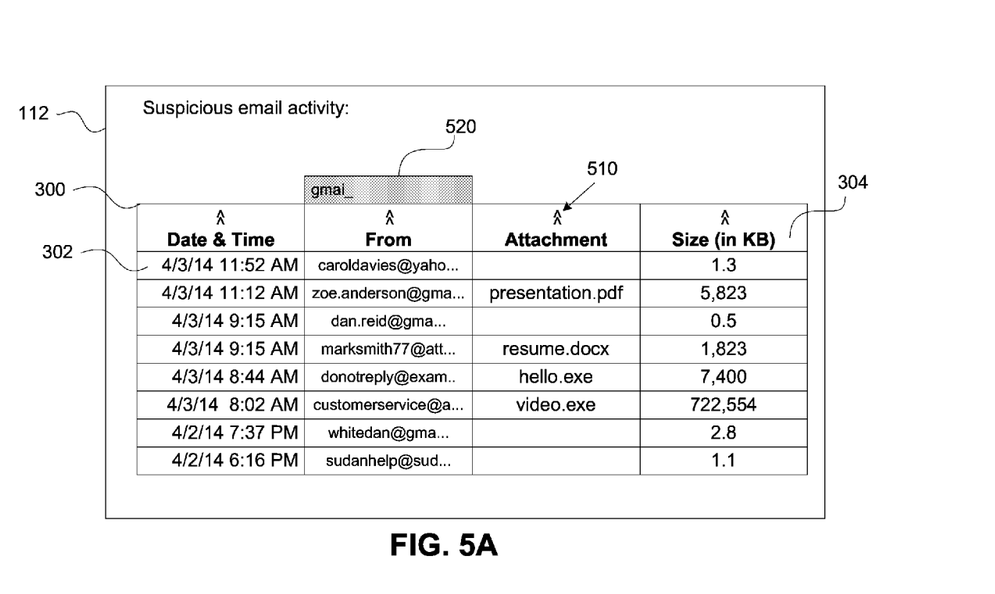
FIGS. 5A-5F illustrate exemplary user interactions with exemplary tables of data values, consistent with embodiments of the present disclosure.
Figure 5B:
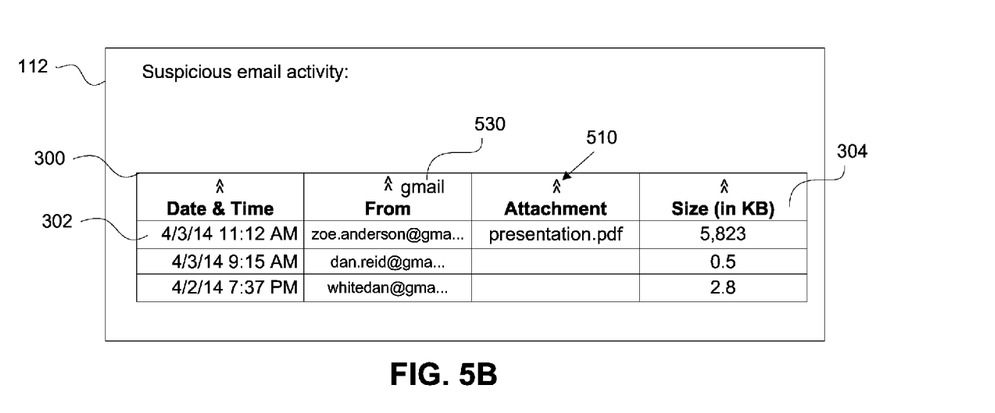

In some embodiments, the electronic device can display a filter location indicator for each column (or to each column to which a filter can be applied), which indicates to the user where he or she can click (or move a cursor to) in order to enter the filter input for each column. For example, FIG. 5A shows an exemplary table 300 having filter location indicators 510 displayed inside each column header 304. The user can select a filter location indicator, after which the electronic device can display, at or near the predetermined filter location, a GUI widget or interface suitable for receiving the filter input from the user, such as text box 520 illustrated in FIG. 5A, or any other suitable widget or interface. After the user enters the filter input, and after the filter input is applied by the electronic device to the table (as discussed in detail below), the applied filter input can be displayed at or near the predetermined filter location (see, e.g., applied filter indicator 530 in FIGS. 5B, 5D, and 5F).

While the filter location indicator, the interface for receiving the filter input, and the applied filter indicator are described herein as being displayed at or near the predetermined filter location, it is understood that they may or may not be displayed at the exact same location, but each of them, if displayed, can be displayed at a location that is visually associated with the corresponding column. For example, as illustrated in FIG. 5A, the filter location indicator can be located inside the column header (e.g., above the column title), the interface for receiving the filter input can be displayed above, below, or to the side of the column header (e.g., directly adjacent to the column header, substantially adjacent to the column header, with some overlap with the column header, and so forth), and the applied filter indicator can be located either inside the column header (e.g., instead of or next to the filter location indicator) or above, below, or to the side of the column header (e.g., directly adjacent to the column header, substantially adjacent to the column header, with some overlap with the column header, and so forth).

In addition, in some embodiments, the electronic device may not display the filter location indication, and the user can select any location that is visually associated with a particular column. For example, the user can select any location on the display (e.g., by clicking on it with a mouse or another pointing device), after which the electronic device can display a GUI interface (e.g., a text box) at or near the selected location, allowing the user to input the filter input into that interface. The electronic device can also determine, based on the selected location, which column is visually associated with the selected location, and apply the filter input to that column.

Allowing the user to enter his or her input at a location (either predetermined or selected in real time) that is visually associated with a particular column is beneficial to the user because the user does not have to divert his or her attention from the underlying data values and can immediately see which filter input applies to which column. It also allows the user to easily see how displayed data values are affected when the user modifies or cancels filter inputs.

In some embodiments, the entered filter input can include textual input, which can include any combination of one or more numeric characters, alphabetic characters, special characters, or any other types of characters. The textual filter input can be entered into a text box (e.g., text box 520) located at a location associated with a particular column.

In some embodiments, the filter input can also include one or more values selected by the user among a set of values. For example, the electronic device can display at the selected or predetermined location associated with a particular column a list (not shown) of one or more values, such as all data values appearing in the particular column, and the user can select one or more of those values. The list can be presented by the electronic device in a scrollable combo box, dropdown list, or another suitable GUI interface.

Still referring to step 420, in some embodiments, the filter input can include a range selected by the user. The range can be a numeric range defined, for example, by one limit (e.g., "all numbers greater than 100" or "all numbers less than 150"), by two limits (e.g., "all numbers between 100 and 150"), or by more than two limits (e.g., "all numbers between 100 and 150 and all numbers above 300"). The range can also be an alphabetical range defined by one, two, or more strings, in a manner similar to that described above. For example, the range can be defined as all strings that alphabetically fall between the strings "cat" and "dog."

In some embodiments, the user can define the range by using visual controls, instead of or in addition to manually entering the range limit(s). For example, the electronic device can assist the user by first displaying the range of all the data values (e.g., all data values in a particular column visually associated with the first location). The range of all values can be displayed, for example, in the form of a ruler, a slider, or another suitable GUI interface.

In some embodiments, the electronic device can display a graph or a histogram (e.g., graph 550 in FIG. 5E), representing the statistical distribution of all the values in a particular column. The electronic device can then display, on or near the graph, one or more moveable handles (e.g., handles 560 in FIG. 5E), which can be moved by the user and which define the desired range. The range can also be reflected in a numeric form (e.g., minimum and maximum values 570 in FIG. 5E), allowing the user to see and modify the exact range that is being selected.

As discussed above, the user can, in some embodiments, input multiple filter inputs at locations visually associated with the same column. For example, when the user finishes entering text into one text box (e.g., text box 520), another text box (e.g., text box 525 illustrated in FIG. 5C) can be automatically added by the electronic device below or next to the first text box, and so forth.

In some embodiments, the user can at any time update the filter input, for example, by modifying or adding text to the text boxes, selecting or unselecting values from a value list, or changing the range limits, and so forth. The user can also remove filters, for example, by displaying the filters via clicking on the filter location indicator, and then removing the filter inputs, e.g., by clicking on the "x" symbol 540 illustrated in FIG. 5C.

In some embodiments, filter inputs of different types, such as the types discussed above, or any other types, can be applied to and visually associated with the same column. In addition, as mentioned above, the electronic device can receive filter inputs to more than one column. For example, the user can first enter one or more filter inputs at one predetermined filter location that is in visual association with one column, and then enter one or more filter inputs at another location that is in visual association with another column. Thus, the user can add unlimited number of filter inputs of various types to any number of columns, and the electronic device can filter the table based on all the filter inputs, as described below.

At step 430, for each column that has any filter input visually associated with it, the electronic device can determine any data values in that column that correspond to the filter input. For example, when a filter input includes a string of characters, the electronic device can determine any data values in the associated column that contain the string of characters. For example, if the filter input includes a string of characters "dan," the electronic device can determine that the following data values correspond to the filter input: "browndan@example.com," "Sudanese," "Dan," and "Dan Brown." The determination can be either case sensitive, or not case sensitive, as in the above example. In some embodiments, the filter input can be inclusive and specify criteria for desired data values as described in the example above, or it can be exclusive and specify criteria for undesired data values. An example of an exclusive filter input can be "NOT dan," in which the corresponding data values determined at step 430 can include all data values that do not contain the string "dan," that is any values except "browndan@example.com," "Sudanese," "Dan," and "Dan Brown."

As another example, when the filter input includes a range of values, the electronic device can determine any data values in the associated column that correspond to the range, i.e., that fall within the range. For example, if the filter input includes a range "136-184," the electronic device can determine that the following data values correspond to the filter input: 140, 159, 159, and 184. The range can be exclusive or inclusive, as in the above example. Also, as illustrated in the above example, sometimes there can be several identical data values in the same column, so there could be several identical data values that correspond to the filter input.

As yet another example, when filter input includes a list of values selected by the user, the electronic device can determine, at step 430, any data values in the associated column that correspond to the selected values on the list.

Figure 5C:
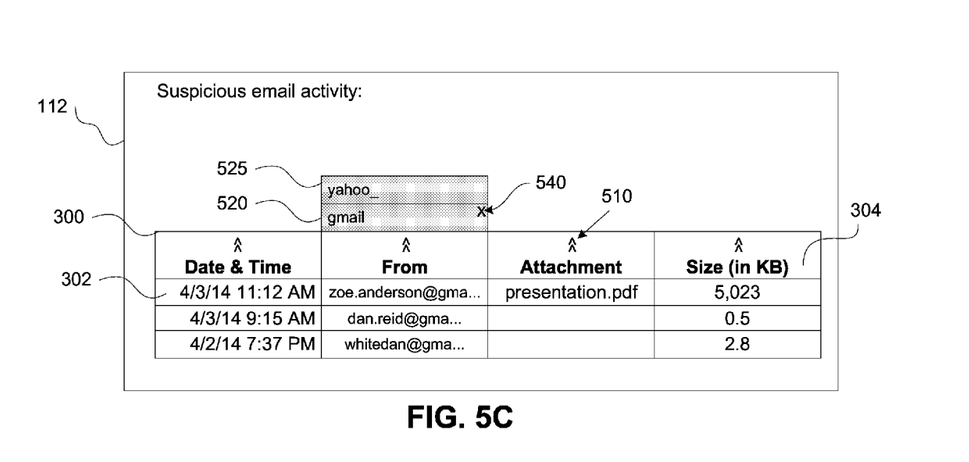
Figure 5D:
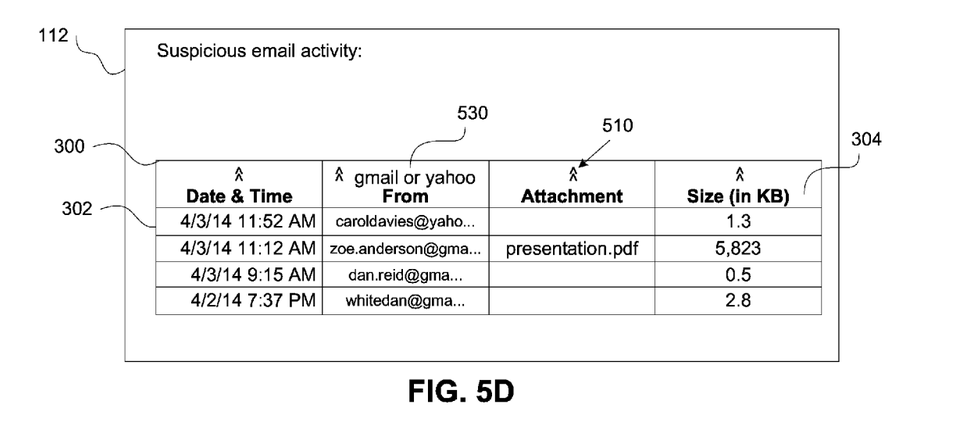
Figure 5E:
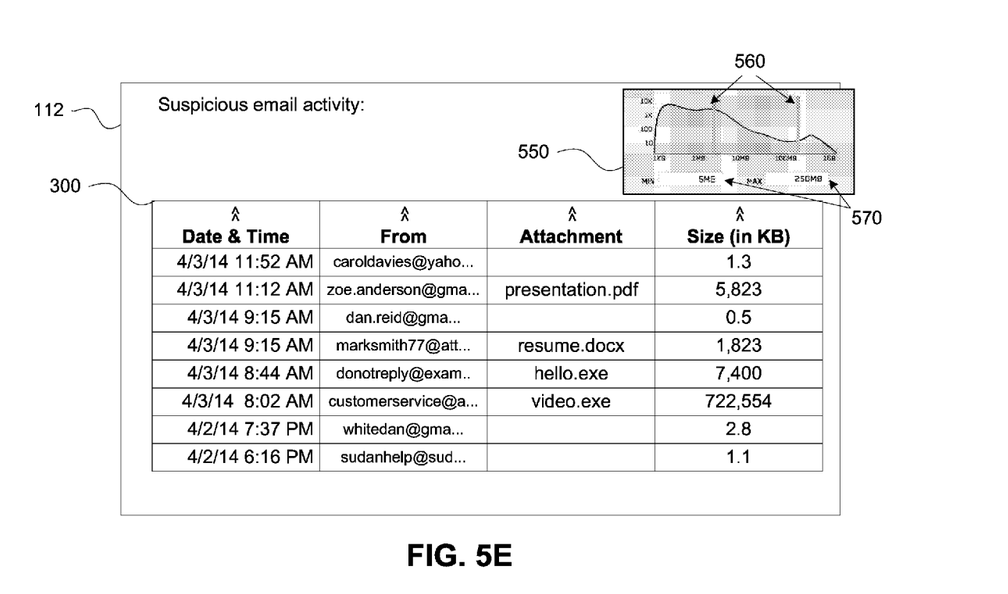
Figure 5F:
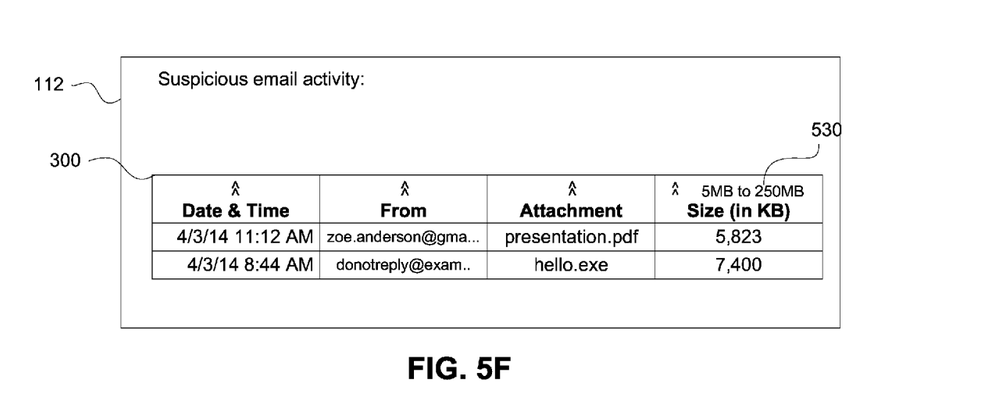

As discussed above, in some embodiments, several filter inputs can be associated with one column. In these embodiments, the electronic device can either apply a logical "OR" or a logical "AND" between the several filter input, depending, for example, on a predetermined setting which can be modified by the user. If logical "OR" is applied, the electronic device will determine, at step 430, any data values in the column that correspond to either of the filter inputs (as illustrated in FIGS. 5C and 5D), and if logical "AND" is applied, the electronic device will determine any data values in the column that correspond to each of the filter input (not illustrated).

At step 440, the electronic device can remove (or hide) from the displayed table any rows that do not comprise the data values determined at step 430, that is, any rows whose data values in a particular column do not correspond to the one or more filter inputs visually associated with that column. In some embodiments, the removal occurs automatically when the electronic device determines that the user has entered or updated the filter input (e.g., any time the user adds or modifies any filter input). In other embodiments, the removal occurs only after the user indicates to the electronic device that he or she would like to refresh the table based on the updated filter inputs, for example, by clicking on a "Refresh" button.

While in the above examples the electronic device determines at step 430 data values that correspond to filter input(s), and then at step 440 removes rows that do not contain those data values, it is appreciated that the electronic device can instead determine at step 430 data values that do not correspond to filter input(s), and then at step 440 remove rows that contain those data values.

Steps 430 and 440 can be repeated for each of the columns that have any filter inputs associated therewith, and as a result, any rows that have not been removed by the electronic device satisfy each of the one or more filter inputs visually associated with one or more columns.

In some embodiments, as mentioned above, the initial set of filter inputs can be entered automatically entered and applied by the electronic device based on input from a file, a memory, or another process running on the electronic device or remotely. For example, a user can receive (e.g., through email) a link to a particular event among a plurality of events. The user can then select the link, which can cause the electronic device to present a table (e.g., table 300) and automatically apply a set of filter inputs such that only the particular event is visible, and the remaining events are hidden. The user can then manually modify or remove some of the automatically applied filter inputs, which can cause additional events to appear in the table.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. An electronic device comprising:
    one or more computer-readable storage media configured to store instructions; and
    one or more processors configured to execute the instructions to cause the electronic device to:
        provide a table having data values arranged in rows and columns;
        provide a first filter location indicator at a location that is visually associated with a first column, wherein the location of the provided first filter location indicator is visually associated with the first column based on the provided first filter location indicator being closer in proximity to the first column than to another column in the table;
        provide a first interface based on a selection of the provided first filter location indicator, wherein the first interface is at a location that is visually associated with the first column;
        acquire a first filter input entered into the first interface;
        filter the table based on the acquired first filter input;
        provide the filtered table for displaying; and
        provide an applied filter indicator at a location that is visually associated with the first column, the applied filter indicator comprising at least the first filter input.

2. The electronic device of claim 1, wherein the filter location indicator, the first interface, and the applied filter indicator are provided inside or substantially adjacent to a header of the first column.

3. The electronic device of claim 1, wherein the first filter input comprises a string of characters, and the filtering of the table comprises determining in the first column data values comprising the string of characters and removing from the table one or more rows that do not comprise the determined data values in the first column.

4. The electronic device of claim 1, wherein the one or more processors are further configured to execute the instructions to cause the electronic device to:
    provide a second interface, wherein the second interface's location is visually associated with the first column;
    acquire a second filter input entered into the second interface;
    further filter the table based on the acquired second filter input; and
    update the applied filter indicator to comprise the first and the second filter inputs.

5. The electronic device of claim 4, wherein the first interface and the second interface are Graphical User Interface (GUI) widgets of different types.

6. The electronic device of claim 1, wherein the first filter input comprises a range of values, and the filtering of the table comprises determining in the first column data values corresponding to the range of values and removing from the table one or more rows that do not comprise the determined data values in the first column.

7. The electronic device of claim 6, wherein the one or more processors are further configured to execute the instructions to cause the electronic device to:
    provide a chart representing distribution of data values in the first column, the chart comprising one or more user-adjustable handles defining the range of values.

8. The electronic device of claim 1, wherein the one or more processors are further configured to execute the instructions to cause the electronic device to:

provide a second filter location indicator whose location is visually associated with a second column;

provide a second interface based on a selection of the second filter location indicator, wherein the second interface's location is visually associated with the second column;

acquire a second filter input entered into the second interface; and filter the table based on the acquired first and second filter inputs.

9. A method for active column filtering, the method being performed by one or more processors and comprising:

providing a table having data values arranged in rows and columns;

providing a first filter location indicator at a location that is visually associated with a first column, wherein the provided first filter location indicator is visually associated with the first column based on the provided first filter location indicator being closer in proximity to the first column than to another column in the table;

providing a first interface based on a selection of the provided first filter location indicator, wherein the first interface is at a location that is visually associated with the first column;

acquiring a first filter input entered into the first interface;

filtering the table based on the acquired first filter input;

providing the filtered table for displaying; and providing an applied filter indicator at a location that is visually associated with the first column, the applied filter indicator comprising at least the first filter input.

10. The method of claim 9, wherein the filter location indicator, the first interface, and the applied filter indicator are provided inside or substantially adjacent to a header of the first column.

11. The method of claim 9, wherein the first filter input comprises a string of characters, and the filtering step comprises determining in the first column data values comprising the string of characters and removing from the table one or more rows that do not comprise the determined data values in the first column.

12. The method of claim 9, further comprising:

providing a second interface, wherein the second interface's location is visually associated with the first column;

acquiring a second filter input entered into the second interface;

further filtering the table based on the acquired second filter input; and updating the applied filter indicator to comprise the first and the second filter inputs.

13. The method of claim 12, wherein the first interface and the second interface are Graphical User Interface (GUI) widgets of different types.

14. The method of claim 9, wherein the first filter input comprises a range of values, and the process of filtering comprises determining in the first column data values corresponding to the range of values and removing from the table one or more rows that do not comprise the determined data values in the first column.

15. The method of claim 14, further comprising:

providing a chart representing distribution of data values in the first column, the chart comprising one or more user-adjustable handles defining the range of values.

16. The method of claim 9, further comprising:

providing a second filter location indicator whose location is visually associated with a second column;

providing a second interface based on a selection of the second filter location indicator, wherein the second interface's location is visually associated with the second column;

acquiring a second filter input entered into the second interface; and filtering the table based on the acquired first and second filter inputs.

17. A non-transitory computer-readable medium storing a set of instructions that are executable by one or more electronic devices, each having one or more processors, to cause the one or more electronic devices to perform a method, the method comprising:

providing a table having data values arranged in rows and columns;

providing a first filter location indicator at a location that is visually associated with a first column, wherein the provided first filter location indicator is visually associated with the first column based on the provided first location indicator being closer in proximity to the first column than to another column in the table;

providing a first interface based on a selection of the provided first filter location indicator, wherein the first interface is at a location that is visually associated with the first column;

acquiring a first filter input entered into the first interface;

filtering the table based on the acquired first filter input;

providing the filtered table for displaying; and providing an applied filter indicator at a location that is visually associated with the first column, the applied filter indicator comprising at least the first filter input.

18. The non-transitory computer-readable medium of claim 17, wherein the filter location indicator, the first interface, and the applied filter indicator are provided inside or substantially adjacent to a header of the first column.

19. The non-transitory computer-readable medium of claim 17, further comprising instructions executable by the one or more electronic devices to cause the one or more electronic devices to perform:

providing a second interface, wherein the second interface's location is visually associated with the first column;

acquiring a second filter input entered into the second interface;

further filtering the table based on the acquired second filter input; and updating the applied filter indicator to comprise the first and the second filter inputs.

20. The non-transitory computer-readable medium of claim 17, wherein the first filter input comprises a range of values, and the filtering of the table comprises determining in the first column data values corresponding to the range of values and removing from the table one or more rows that do not comprise the determined data values in the first column, the non-transitory computer-readable medium further comprising instructions executable by the one or more electronic devices to cause the one or more electronic devices to perform:

providing a chart representing distribution of data values in the first column, the chart comprising one or more user-adjustable handles defining the range of values.

* * * * *